US008260784B2

(12) United States Patent
Beyer et al.

(10) Patent No.: US 8,260,784 B2
(45) Date of Patent: Sep. 4, 2012

(54) INDEXING AND SEARCHING JSON OBJECTS

(75) Inventors: Kevin Scott Beyer, San Francisco, CA (US); Jun Rao, San Jose, CA (US); Eugene J Shekita, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 12/371,005

(22) Filed: Feb. 13, 2009

(65) Prior Publication Data

US 2010/0211572 A1 Aug. 19, 2010

(51) Int. Cl.
*G06F 7/00* (2006.01)
(52) U.S. Cl. ........ 707/742; 707/791; 707/797; 715/200; 715/234
(58) Field of Classification Search .................. None
See application file for complete search history.

(56) References Cited

U.S. PATENT DOCUMENTS

| | | | | |
|---|---|---|---|---|
| 7,043,088 | B2 * | 5/2006 | Chiu et al. | 382/233 |
| 2005/0223070 | A1 * | 10/2005 | Ordille et al. | 709/206 |
| 2005/0228768 | A1 * | 10/2005 | Thusoo et al. | 707/1 |
| 2007/0112813 | A1 * | 5/2007 | Beyer et al. | 707/101 |
| 2008/0133473 | A1 * | 6/2008 | Broder et al. | 707/3 |
| 2009/0248737 | A1 * | 10/2009 | Shukla et al. | 707/103 R |
| 2009/0271690 | A1 * | 10/2009 | Iglesias | 715/200 |
| 2010/0011013 | A1 * | 1/2010 | Singh | 707/101 |

OTHER PUBLICATIONS

Kaushik et al., "On the Integration of Structure Indexes and Inverted Lists," SIGMOD 2004, Paris, France, Jun. 13-18, 2004, 12pgs.
Chien et al., "Efficient Structural Joins on Indexed XML Documents," Proceedings of the 28th VLDB Conf., Hong Kong, China, Aug. 20-23, 2002, 12pgs.
Jiang et al., "Holistic Twig Joins on Indexed XML Documents," Proceedings of the 29th VLDB Conf., Berlin, Germany, Sep. 9-12, 2003, 12pgs.
Yang et al., "Virtual Cursors for XML Joings," CIKM 2004, Washington, DC, USA, Nov. 8-13, 2004, 10pgs.
Jiang et al., "Efficient Processing of XML Twig Queries with OR-Predicates," SIGMOD 2004, Paris, France, Jun. 13-18, 2004, 12pgs.
Fontoura et al., "Optimizing Cursor Movement in Holistic Twig Joins," CIKM 2005, Bremen, Germany, Oct. 31-Nov. 5, 2005, 8pgs.
O'Neil et al., "ORDPATHs: Insert-Friendly XML Node Labels," SIGMOD 2004, Paris, France, Jun. 13-18, 2004, 6pgs.

* cited by examiner

*Primary Examiner* — Fred I Ehichioya
*Assistant Examiner* — Hasanul Mobin
(74) *Attorney, Agent, or Firm* — IP Authority, LLC; Ramraj Soundararajan

(57) ABSTRACT

Disclosed is a method of encoding JavaScript Object Notation (JSON) documents in an inverted index, wherein a tree representation of a JSON document is first generated, and, next, the JSON document is shredded into a list of <value, path, type, jdewey> tuples for each atom node, n, in the tree, where value is a label associated with n, path is a concatenation of node labels associated with ancestors of n, type is a description of a type of value, and jdewey of n is a partial Dewey code of its closest ancestor array node, if one exists, or empty, otherwise. Lastly, an inverted index is built using <path, type, value> as index term, and jdewey as payload. A method is also described to search the inverted index.

16 Claims, 14 Drawing Sheets

```
EvaluateQuery(doc-tree-root, jdewey-tree-root){
  open cursors for all atom nodes in doc-tree
  while ((docID = GetNextMatch(doc-tree-root)) != null) {
    //docID is a candidate match
    open cursors for all atom nodes in jdewey-tree
    if (GetNextMatch(jdewey-tree-root) != null)
      output docID
  }
}
```

FIG. 5

```
GetNextMatch(root) {
  if (first-time call)
    InitCur(root) // initialize variable cur in all nodes
  else
    UnitAdvance(root.target) // move root.target by one unit while (true) {
    if (root.cur is null) // if cur is null, no more matches
      return null
    empty lessThanList
    newTarget = max(root.target, root.cur)
    // normally, we just need to set newTarget to cur. However,
    // target may be larger than cur because of the previous
    // UnitAdvance() call. So we need the max of target and cur.
    if (CheckMatch(root, newTarget, lessThanList))
      return root.cur
    else {
      pick a random node n from lessThanList
      n.cur = n.cursor.skipTo(n.target)
      PropagateCurUp(n) //propagate the change in n.cur up
    }
  }
}
```

FIG. 6

```
InitCur(n){
  for each child of n
    InitCur(child)

if (n is atom node)
    n.cur = n.cursor.next()
  eles if (n is an array node)
    n.cur = n.child[0].cur
  else if (n is an AND node)
    n.cur = max of n.child[*].cur
  else if (n is an OR node)
    n.cur = min of n.child[*].cur
}
```

FIG. 7

```
CheckMatch(n, newTarget, lessThanList) {
  n.target=SetTarget(newTarget) // set target from newTarget
  if (n.cur > n.target)
    return false         // can't have a match, return false
  if (n is an atom node) {
    if (n.cur == n.target)
      return true        // matched at this node
    else {
      lessThanList.add(n)    // doesn't match at this node, add it to
lessThanList
      return false     // so that we can move its cursor later
    }
  }
  else if (n is an array node)
    return CheckMatch(n.child[0], n.target, lessThanList)
  else if (n is an AND node) {
    ret = true
    for each child of n
      ret = ret & CheckMatch(child, n.target, lessThanList))
    return ret
  }
  else if (n is an OR node) {
    ret = false
    for each child of n
      ret = ret | CheckMatch(child, n.target, lessThanList))
    return ret
  }
```

FIG. 8

```
PropagateCurUp(n){
  if (n is an array node)
    n.cur = n.child[0].cur
  else if (n is an AND node)
    n.cur = max of n.child[*].cur
  else if (n is an OR node)
    n.cur = min of n.child[*].cur if (n.parent != null)
    PropagateCurUp(n.parent)
}
```

FIG. 9

INDEXING AND SEARCHING JSON OBJECTS

BACKGROUND OF THE INVENTION

1. Field of Invention

The present invention relates generally to the field of indexing. More specifically, the present invention is related to indexing JavaScript Object Notation (JSON) documents.

2. Discussion of Related Art

JSON (JavaScript Object Notation) is a lightweight data-interchange format. It is based on a subset of the JavaScript Programming language. More and more web-based applications exchange and/or store information in JSON format. Indexing and searching JSON data are critical for those applications.

JSON is built on two structures: (1) a collection of name/value pairs; and (2) an ordered list of values. The formal definition of a JSON value is given below.

```
value   ::= object | array | atom
object  ::= (field : value)*
array   ::= (value)*
atom    ::= string | number | true | false | null
field   ::= string
```

For example, the following is a valid JSON object. By convention, objects are enclosed within "{ }" and arrays are encloses within "[ ]". Also, strings are quoted and numbers are not quoted. It is important to understand that field names are unique within an object.

```
{
   firstName: "John",
   lastName: "Smith",
   address: {
      streetAddress: "21 2nd Street",
      city: "New York",
      state: "NY",
      postalCode: 10021
   },
   phoneNumbers: [
      "212 732-1234",
      "646 123-4567"
   ]
}
```

Embodiments of the present invention are an improvement over prior art JSON indexing and searching methods.

SUMMARY OF THE INVENTION

The present invention provides for a method of encoding JavaScript Object Notation (JSON) documents in an inverted index, wherein the method comprises the steps of: generating a tree representation of a JSON document; shredding the JSON document into a list of <value, path, type, jdewey> tuples for each atom node, n, in the tree, where value is a label associated with n, path is a concatenation of node labels associated with ancestors of n, starting from a root of the tree, type is a description of a type of value, and jdewey of n is a partial Dewey code of its closest ancestor array node, if one exists, or empty, otherwise; and building an inverted index using <path, type, value> as index term, and jdewey as payload.

The present invention also provides for a method to search the above-mentioned inverted index, wherein the method further comprises the steps of: receiving a search query and constructing a parse tree from said received search query; generating a first evaluation tree from the constructed parse tree to indentify a set of candidate JSON documents that match the search query; generating a second evaluation tree from the constructed parse tree to identify a subset of the set of candidate JSON documents that exactly match the search query; and evaluating the received search query based on the parse tree, first evaluation tree, and second evaluation tree, and outputting results of the evaluation. By using two evaluation trees, searching is accomplished via a first phase that identifies potential matching JSON documents using the index without accessing the payload and via a second phase that computes the exact matching JSON documents using said payload.

BRIEF DESCRIPTION OF THE DRAWINGS

FIG. 5 through FIG. 9 illustrate various sample codes associated with the method of the present invention.

DESCRIPTION OF THE PREFERRED EMBODIMENTS

Figure 1:
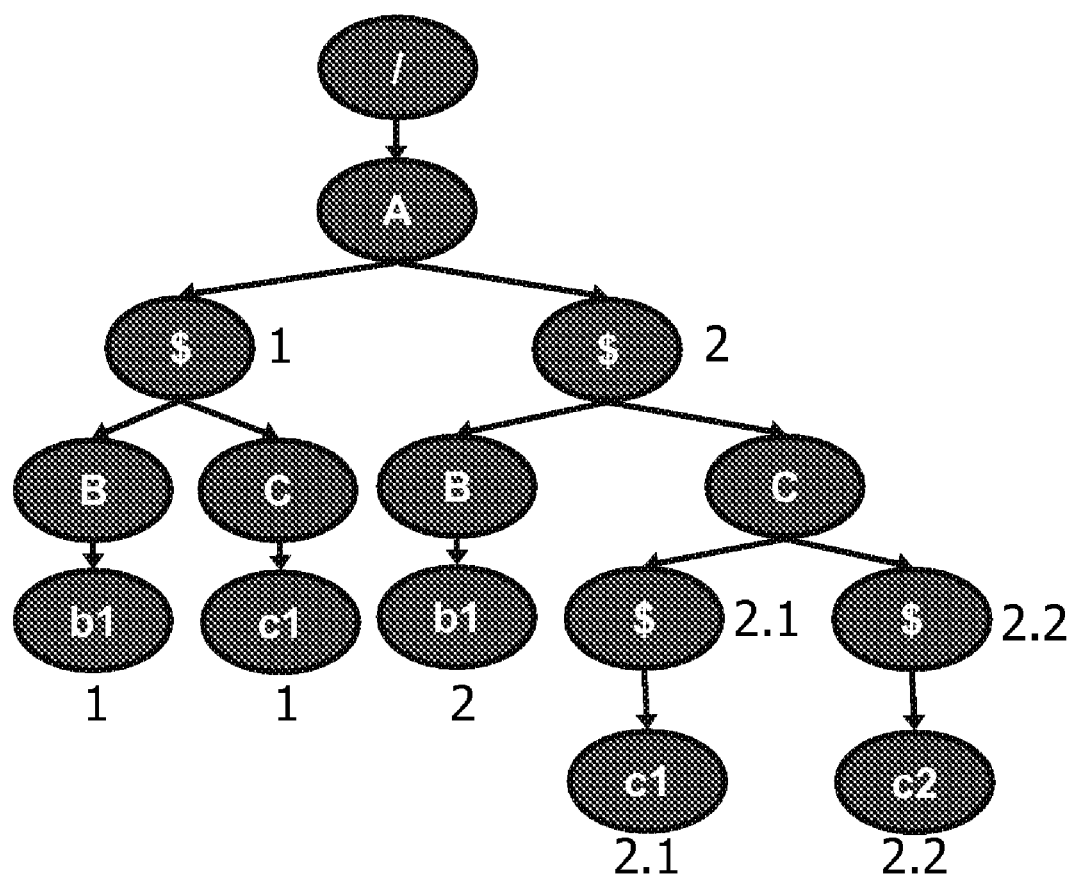
FIG. 1 illustrates a tree representation of document d.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Similar to XML, JSON documents are hierarchical. JSON documents can represent data structures and associative arrays (called objects), wherein the data associated with the data structures and/or data associated with the objects may be associated with tangible items. For example, data associated with a JSON representation could be that of an object that describes a physical server.

There exist extensive works on indexing/searching XML data. See, for example, the paper to Kaushik et al. entitled, "On the Integration of Structure Indexes and Inverted Lists", the paper to Chien et al. entitled, "Efficient Structural Joins on Indexed XML Documents", the paper to Jiang et al. entitled, "Holistic twig joins on indexed XML documents", the paper to Yang et al. entitled, "Virtual Cursors for XML Joins", the paper to Jiang et al. entitled, "Efficient Processing of XML Twig Queries with OR-Predicates", and the paper to Fontoura et al. entitled, "Optimizing Cursor Movement in Holistic Twig Joins".

Compared with XPath, the searching of JSON documents is much simplified. When searching XML documents using XPath, the results have to include all possible matching nodes within the document. In contrast, the present invention's method only returns matches at JSON document level. A matching document is returned exactly once no matter how many times a search query matches within a document. This simplifies the present invention's search algorithm significantly since it does not have to maintain stacks for matching nodes within a document and enumerate all possible combinations of them. Also, our search language requires the specification of an exact JSON structure. As a result, all the complexities of dealing with different XPath axis disappear. Returning matches at document level is desirable for many applications. For example, in faceted search, each matching document is counted exactly once per facet. Further, field names are unique within an object in JSON. This is taken advantage of by using "partial" Dewey codes when indexing JSON documents. In contrast, XML indexes have to use full Dewey codes or their equivalent. This saves space for storing the index and also allows for the optimization of certain types of search queries. Since JSON is truly self-describing (no need for DTD or schema as in the case of XML), index atomic values can be appropriately indexed according to their types (e.g., for range query).

Indexing JSON Documents in an Inverted Index:

JSON documents are indexed in an inverted index since it is well suited for search over semi-structured data. Given a document in JSON format, a tree representation of the document is created as follows. First, an artificial root node is created and labeled with "/". Next, a look-up is done at the top level of the JSON document. If it is an atomic value, a child node (referred to as atom node) labeled with the value is added to the root. If it is an object, for each object field, a child node (referred to as field node) labeled with the field name is added to the root. Otherwise, it is an array. For each array element, a child node (referred to as array node) labeled with "$" is added to the root. For the latter two cases, the present invention's method descends to each child node and constructs the rest of the tree recursively based on the lower levels of the JSON document. Given a JSON document d =
    { A : [ { B: "b1", C: "c1" },
          { B: "b1", C: ["c1", "c2"] }
      ]
    }

The tree representation of d is depicted in FIG. 1.

To index a JSON document, a "partial" dewey code called jdewey is associated for each atom node in the tree. A jdewey code in calculated as follows. First, all array nodes are encoded using multi-part Dewey decimals. The jdewey code for an atom node is the Dewey code of its closest ancestor array node, if one exists, or empty, if otherwise. The jdewey codes for d are listed under the atom nodes in FIG. 1. Then, a JSON document is shred into a list of <val, p, t, j> tuples for each atomic node n in the tree, where val is the label of n, p is a concatenation of the label of ancestors of n starting from root (labels are separated by "."), t is the type of the atomic value val, and j is the jdewey code associated with node n. Note that because field names are unique in a JSON object, the tuple list losslessly encodes a JSON document, i.e., the original document can be reconstructed from the tuple list. An inverted index is then built using the tuple list.

A typical inverted index is organized as a list of ordered index terms. Each term points to a posting list and each post is a <d, plist> pair, where d is the document ID and plist is an ordered list of positions within the document. Optionally, one can store more information in a payload associated with each position. To build an inverted index, for each tuple generated from a JSON document, an index term is created that is the concatenation of p, t, val, if one doesn't exist already. By putting val as the last part of the term, range predicates are supported on the inverted index. The identifier of the document is inserted to the posting list of the index term if it's not there yet, and a new document position is added with j as the payload. The following depicts the layout of an index after d is indexed. Note that the jdewey code in each payload is also kept in order.

| Inverted index layout | |
|---|---|
| index terms | : document ID[payload list] |
| /.A.$.B.<string>.b1 | : d[1,2] |
| /.A.$.C.<string>.c1 | : d[1] |
| /.A.$.C.$.<string>.c1 | : d[2.1] |
| /.A.$.C.$.<string>.c2 | : d[2.2] |

Searching JSON Documents:

As the present invention involves searching at JSON document level, a search returns a list of ID of the matching JSON documents, not nodes in documents. For simplicity, in this section, queries containing only equality predicates are discussed. Later, this algorithm is extended to support other kinds of predicates. Also, the algorithm described in this section is optimized for inverted indexes (e.g., Lucene) that store posting lists in two separate files, one for document IDs and one for payloads. Such a design often makes conjunctive queries more efficient because most of the time, relatively few documents qualify in a query, so it is better to keep document-level index small. Later, an alternative implementation is discussed when the posting list is stored in a single file.

Query Language and Parse Tree

A simple and intuitive language is defined to search indexed JSON documents. Consider the following two example queries:

P={ A: [ { B: "b1" && C: "c1" } ] }
Q={ A: [ { B: "b1"} && {C: "c1" } ] }

Also, consider the following two JSON documents:

```
d1={ A: [ { B: "b1", C: "c1" },
         { B: "b2", C: "c2" }
       ]
   }
d2={ A: [ { B: "b1", C: "c2" },
         { B: "b2", C: "c1" }
       ]
   }
```

To qualify as a match, a document has to match both the JSON structures as well as the Boolean constraints specified in the query. For example, query P ("&&" specifies conjunction) matches d1, but not d2. The reason is that d2 doesn't have the proper B and C fields within the same JSON object. On the other hand, query Q matches both d1 and d2, since it doesn't require the B field and the C field to be in the same JSON object.

Figure 2A:
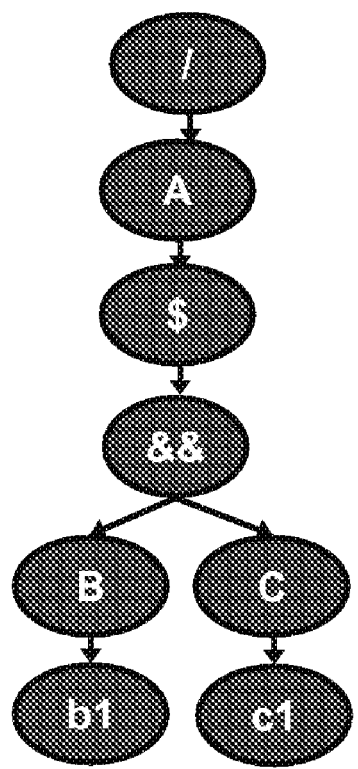
FIGS. 2A through 2C illustrate the parse tree, doc-tree, and jdewey-tree for P.

From a search query, a parse tree is first constructed. For example, the parse tree for query P is given in FIG. 2A. FIG. 2A is very similar to a JSON document tree, except that it has additional nodes labeled with Boolean constraints. In the preferred embodiment, two types of Boolean constraints are considered: conjunctive and disjunctive, wherein the corresponding nodes are referred to as AND nodes and OR nodes, respectively. Two evaluation trees are generated from a parse tree, one (doc-tree) for identifying candidate JSON documents that may match the query, and another (jdewey-tree) for checking whether those candidates match the query exactly. A jdewey-tree is derived from the parse tree by removing all field nodes and the root node. A doc-tree is derived from a jdewey-tree by further removing array nodes. The parse tree and the two evaluation trees are needed in the runtime for query evaluation.

Figure 2B:
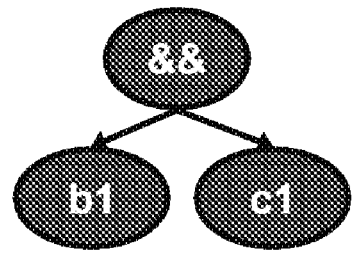
Figure 2C:
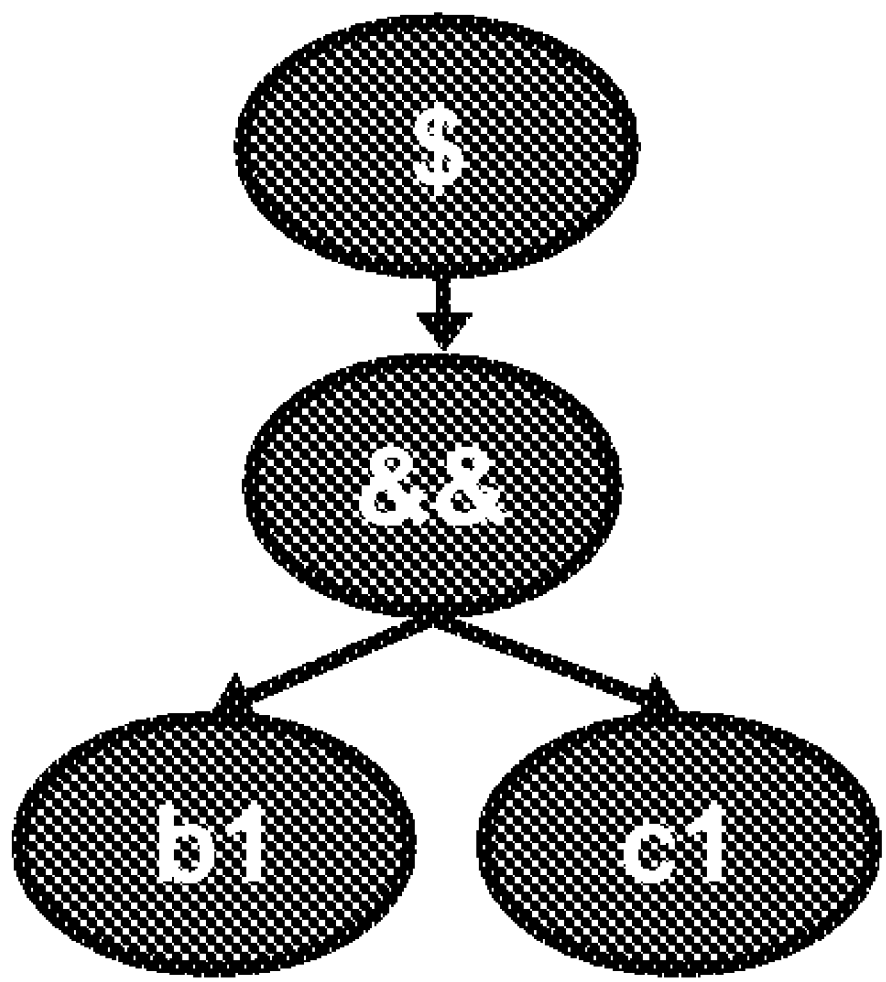
Figure 3A:
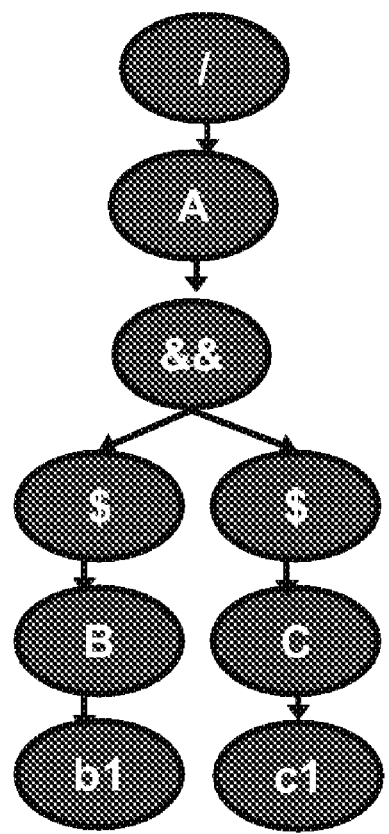
FIG. 3A, FIG. 3B, and FIG. 4 illustrate the parse tree and the two evaluation tree for query Q.
Figure 3B:
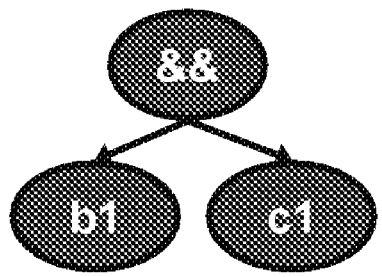
Figure 4:
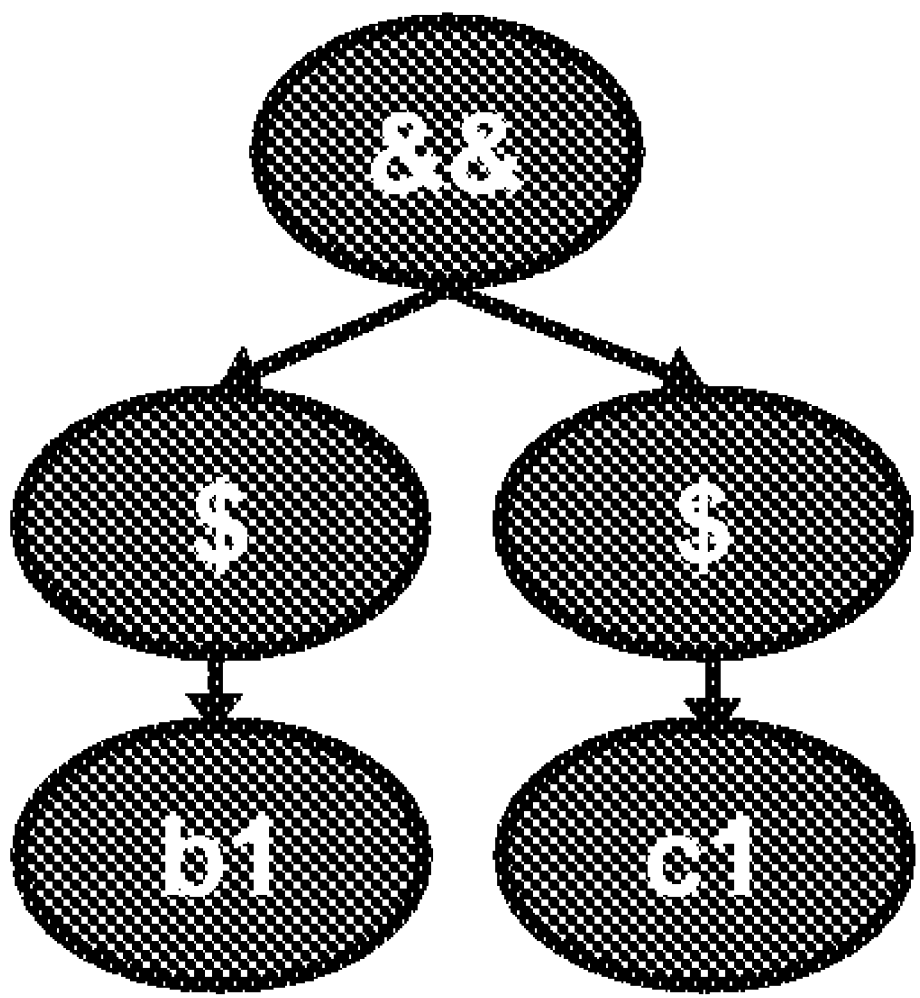

The doc-tree and jdewey-tree for query P are given in FIG. 2B and FIG. 2C, respectively. Each atom node is associated in the evaluation tree with an index cursor that iterates through an ordered list of IDs. For example, the cursor for nodes labeled "b1" and "c1" in FIG. 2B would correspond to index terms /.A.$.B.<string>.b1 and /.A.$.B.<string>.c1, respectively. Note that ID is a generic base type. In a doc-tree, ID is instantiated as document ID, and in a jdewey-tree, it is instantiated as jdewey codes. It is assumed that each cursor supports two functions, next( ), which returns the next ID is the list, and skipTo(target), which returns the first ID in the list larger than or equal to target. When no more IDs are available in a next( ) or skipTo( ) call, it is assumed that a null ID is returned and it is larger than any non-null ID. The details of how the cursors are initialized will be described in the next section. For comparison, the parse tree and the two evaluation tree for query Q are given in FIG. 3A, FIG. 3B, and FIG. 4. Note that the doc-tree between query P and Q are identical. However, the jdewey-trees are different.

Evaluating a Query

To evaluate a query, a method EvaluateQuery( ) is called in FIG. 5. This method uses a two-phase evaluation by calling a main method GetNextMatch( ) twice. The first evaluation is on the doc-tree, and the second is on the jdewey-tree. There are two advantages of this two-phased approach. First, the first phase can prune many documents so that the second phase does not need to fetch the payload on them. Second, the two phases share exactly the same code, which reduces code maintenance.

EvaluateQuery( ) in now discussed. The method first opens the cursors in the atom nodes in the doc-tree. Specifically, for each atom node in a doc-tree, the corresponding atom node n is located in the original parse tree. A path p is computed for n in a way similar to indexing a JSON document, by concatenating the label of all ancestors of n (starting from root). Both AND nodes and OR nodes are ignored when computing the path. Finally, an index term is generated by concatenating p, the type and the atomic value associated with node n. For example, the index term for nodes "b1" and "c1" in FIG. 3 are /.A.$.B.<string>.b1 and /.A.$.B.<string>.c1, respectively.

The cursor is then opened in node n on the posting list in the inverted index whose term matches the generated one. Once opened, the cursor iterates through postings in the posting list. A skipTo(target) call on the cursor moves it to a posting in which the document ID is larger than or equal to target. A next( ) call returns the document ID in the posting next to the one that the cursor is currently on. EvaluateQuery( ) then calls the main method GetNextMatch( ) in FIG. 6 (to be explained in detail below) to enumerate candidate JSON documents that can potentially match the query.

Once a candidate is found, the method opens the cursors in the atom nodes in the jdewey-tree. Specifically, for each atom node m in the jdewey-tree, the corresponding node m' is located in the doc-tree and obtain the posting that the cursor in m' is currently on. The cursor is then opened in m to iterate through the positions of that posting. A skipTo(target) call moves the cursor to a position in which the jdewey (in the payload) code is larger than or equal to target. A next( ) call returns the jdewey code in the next position. Subsequently, EvaluateQuery( ) makes the same GetNextMatch( ) call again on the jdewey-tree to check if the candidate is a true match based on the jdewey codes. Finally, it outputs the candidate if a true match is found.

The main method GetNextMatch( ) is now discussed. Each node in the evaluation trees has two variables, cur and target. Both cur and target are of the generic base type ID. Again, they are instantiated as document ID in a doc-tree and as jdewey code in a jdewey-tree. As one should see later, variable cur is always propagated bottom-up whereas variable target is always propagated top-down. If GetNextMatch( ) is called for the first time, it calls an InitCur( ) method to initialize cur in each node. The InitCur( ) method in FIG. 7 is fairly simple. It first initializes cur in each atom node to the next ID from the cursor, and then propagates cur bottom-up. For an array node, cur is set to the cur of its only child. Cur is set to the maximum (minimum) of cur in all child nodes for an AND (OR) node.

If GetNextMatch( ) is not called for the first time, a previous match must has been returned. The method calls UnitAdance( ) to move target in the root node by a single unit. If target is a document ID, UnitAdance( ) simply adds one to it. Otherwise, target is a jdewey code, and UnitAdance( ) adds one to the last part of the code. The method then continues in a loop. If cur in root is a null value, there are no more matches and the method returns a null ID. Otherwise, the method makes a CheckMatch( ) call on the root node, which fulfills two tasks. First, it returns a Boolean value indicating whether a match is found or not. Second, it populates a list lessThanList, including all atom nodes whose cur is less than that of target. If a match is found, cur in root has the matching ID and is returned. If not, the lessThanList is not empty. The method picks a random node n in that list, and moves cur to the next ID from the cursor that is larger than or equal to target. It then calls PropagateCurUp( ) on node n to propagate cur all the way up to the root node. PropagateCurUp( ) in FIG. 9 works in a way very similar to InitCur( ). The main loop in GetNextMatch( ) continues until no more matches can be found.

CheckMatch( ) is now discussed with respect to FIG. 8. It makes a downward pass of the tree, followed by an upward one. In the downward pass, it first calls SetTarget( ) to set target in the current node. For now, let's assume that target is simply set to newTarget. If cur is larger than target (this means that the next match is to be at target, but the next possible match is already beyond target), the method returns false immediately without visiting any descendant further. Otherwise, it recursively traverses down all the way to atom nodes. Once in an atom node, if cur equals to target, a match is obtained at the node and the method returns true; if cur is less than target, the method adds the atom node to lessThanList and returns false. On the upward pass, an array node simple passes up the value returned from calling its only child. An AND(OR) node returns the logical and (or) of the value returned from calling all its children.

Note that jdewey codes are propagated in the evaluation tree slightly differently from document IDs. When a jdewey code is propagated up from an array node, the last part of the code is stripped off. This is done by customizing the "=" operator in FIG. 7 and FIG. 9 accordingly. SetTarget( ) is customized in FIG. 8. Normally, the function copies the input newTarget to target in the current node. When SetTarget( ) is called on an array node and the input is a jdewey code, a different implementation is provided. Suppose that newTarget has p parts. newTarget is compared with cur on the first p parts. If the former is larger, target is set to a new jdewey code with p+1 parts, with the first p parts identical to newTarget and the last part set to 1. Otherwise, the two must be equal and target is set to newTarget.

An Example

The algorithm is now illustrated through an example. Suppose there exists the following three JSON documents:

```
d1 = { A: [ {B: 'b2', C: 'c2'},
            {B: 'b1', C: 'c2'}
          ]
     }
d2 = { A: [ {B: 'b1', C: 'c2'},
            {B: 'b2', C: 'c1'}
          ]
     }
d3 = { A: [ {B: 'b1', C: 'c1'},
            {B: 'b2', C: 'c2'}
          ]
     }
```

After indexing those documents, the index entries look like the following.

| Inverted index layout | |
|---|---|
| index terms | : document ID[payload list] |
| /.A.$.B.<string>.b1 | : d1[2], d2[1], d3[1] |
| /.A.$.B.<string>.b2 | : d1[1], d2[2], d3[2] |
| /.A.$.C.<string>.c1 | : d2[2], d3[1] |
| /.A.$.C.<string>.c2 | : d1[1,2], d2[1], d3[2] |

Consider the two queries shown earlier:

```
P={ A: [ { B: "b1" && C: "c1" } ] }
Q={ A: [ { B: "b1"} && {C: "c1" } ] }
```

Figure 10:
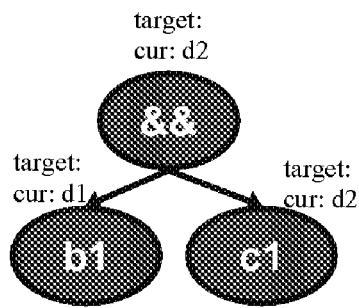
FIG. 10 illustrates the doc-tree after calling InitCur( ).
Figure 11:
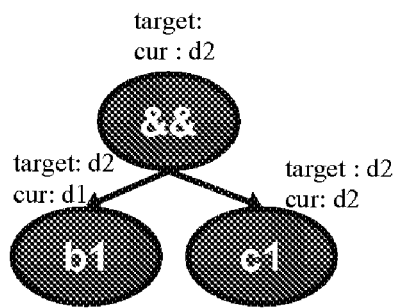
FIG. 11 illustrates the doc-tree after calling Check Match( ).
Figure 12:
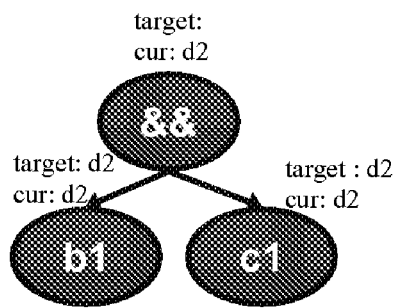
FIG. 12 illustrates the doc-tree after moving the cursor in node "b1" and calling PropagateCurUp( ).
Figure 13:
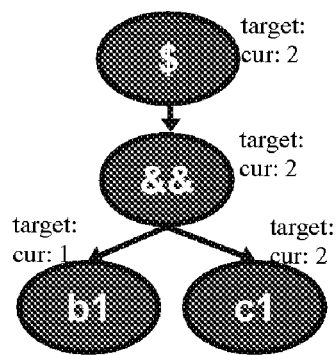
FIG. 13 and FIG. 14 illustrate the jdewey-tree after the InitCur( ) call and a subsequent CheckMatch( ) call, respectively.
Figure 14:
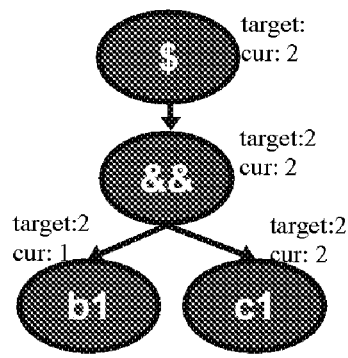
Figure 15:
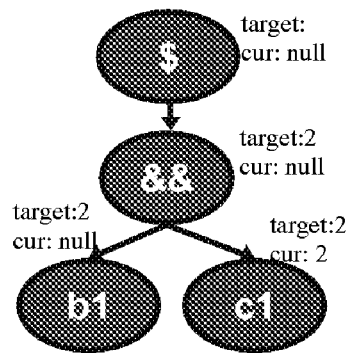
FIG. 15 illustrates the jdewey tree after calling PropagateCurUp( ).

Suppose that query P, given earlier on the index, is evaluated. Note that only document d3 matches the query exactly. To evaluate P, GetNextMatch( ) is first called on the doc-tree given in FIG. 2B. The cursors in the two atom nodes are opened on the document ID lists corresponding to the first and third index entries. After calling InitCur( ), the doc-tree looks like FIG. 10 (cur and target are listed next to each node). After the first CheckMatch( ) call, the doc-tree becomes FIG. 11. The call returns false and lessThanList includes the node labeled with "b1". After moving the cursor in node "b1" and calling PropagateCurUp( ), the doc-tree is given in FIG. 12. The next CheckMatch( ) call returns true, and a potential matching document d2 is returned. After that, the cursors are initialized in the jdewey-tree and make a GetNextMatch( ) call on the jdewey-tree. The jdewey-tree after the InitCur( ) call and a subsequent CheckMatch( ) call is shown in FIG. 13 and FIG. 14, respectively. Since the CheckMatch( ) call returns false, the cursor associated with node "b1" is moved in the jdewey-tree. Because there are no more Jdewey codes, the next( ) call on the cursor returns a null. After calling PropagateCurUp( ), the jdewey-tree is shown in FIG. 15. A null value is returned from the GetNextMatch( ) call on the jdewey-tree and document d2 is ignored since it is not an exact match.

Figure 16:
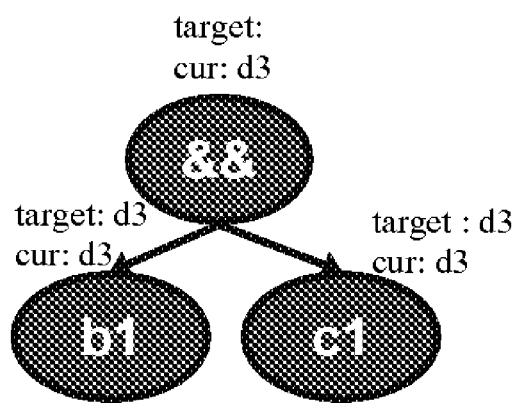
FIG. 16 illustrates the doc-tree after returning to GetNextMatch( ).
Figure 17:
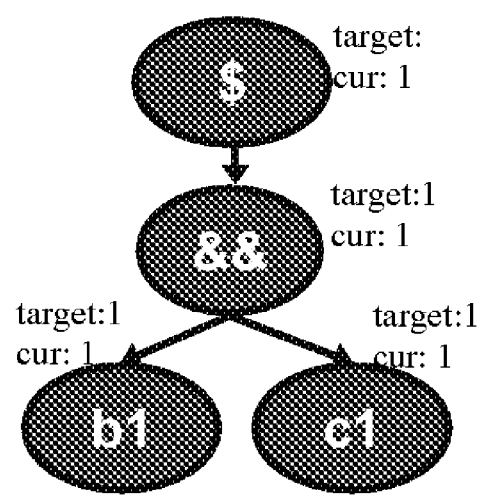
FIG. 17 illustrates the jdewey-tree after returning to GetNextMatch( ).

The method goes back to the GetNextMatch( ) call on the doc-tree again. Eventually, the doc-tree becomes FIG. 16 and this call returns a document ID d3. GetNextMatch( ) is then called on the jdewey-tree again. Eventually, the jdewey-tree becomes FIG. 17 and a non-null jdewey code 1 is returned. At this point, it is found that document d3 matches query P exactly.

Optimization

Figure 18:
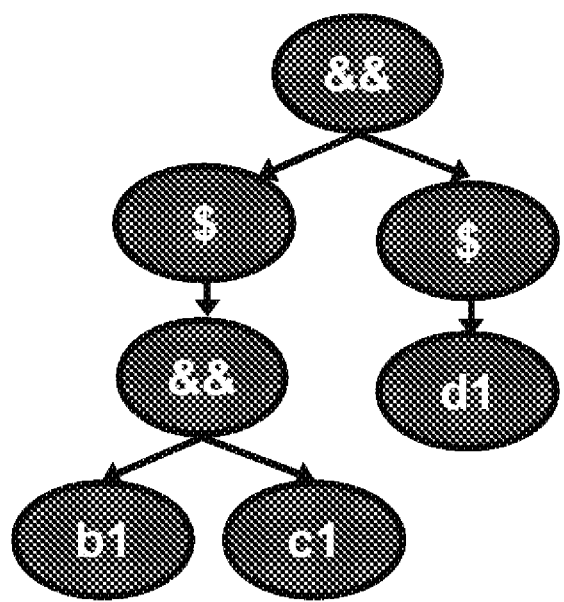
FIG. 18 and FIG. 19 illustrate an example of the optimization process.
Figure 19:
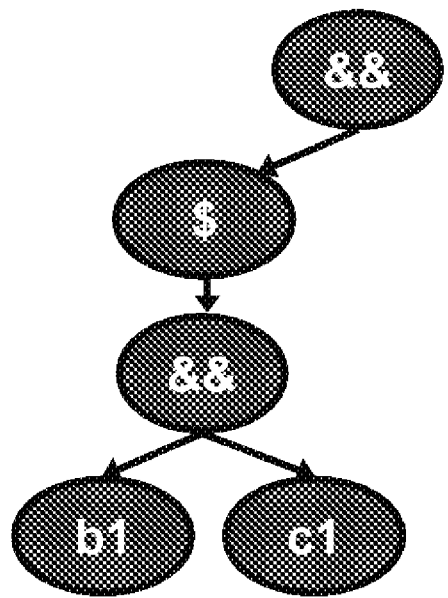

For certain queries, a jdewey-tree can be simplified while preserving the correctness of query evaluation. Given a jdewey-tree, a breadth-first traversal of the tree can be made. Every time an array node is encountered, a check is made to see if the node has any AND node among its descendants. If not, the sub-tree rooted at the array node is completely eliminated. For example, the jdewey-tree in FIG. 18 is simplified to that in FIG. 19. If after simplification, a jdewey-tree has no array node at all, the second GetNextMatch( ) call in FIG. 5 is avoided on the jdewey-tree. In such a case, the evaluation on the doc-tree itself is enough to determine if a document matches the query exactly.

Extensions

In this section, some extensions are described with regards to the core algorithm in previous section.

Non-Equality Predicates

The search runtime is not limited to equality predicates. Consider the following queries:

```
R={ A: >"a1"}
S={ A: "a1" .. "a5"}
T={ A: "a*"}
```

Figure 20:
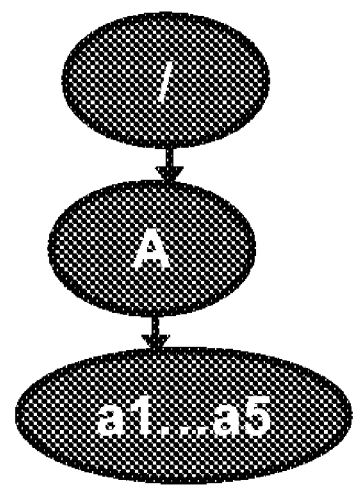
FIG. 20 illustrates an example of an original parse tree for query S, which may be rewritten to that in FIG. 21, if only "a2" and "a3" in the range exist in the inverted index.
Figure 21:
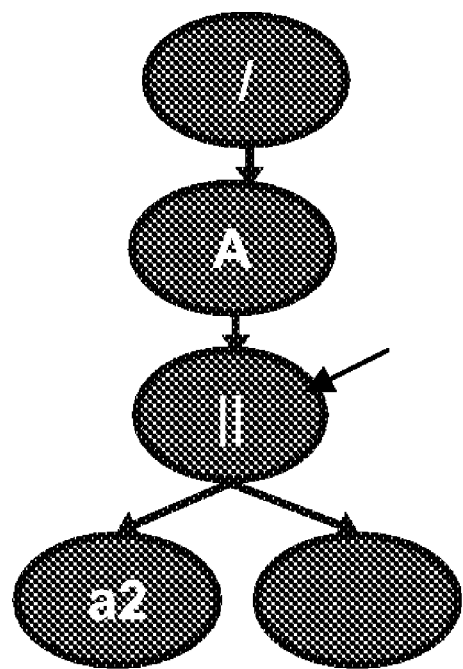

Query R and S have a range predicate and query T has a wildcard predicate. Both types of queries are supported through a rewrite of the parse tree. For example, if an atom node in the parse tree is associated with a range, all index terms in the inverted index that fall into the range are identified. Then, the original atom node is replaced with an OR node. For each identified index term, a corresponding atom node is added under the OR node. For example, the original parse tree (FIG. 20) for query S may be rewritten to that in FIG. 21, if only "a2" and "a3" in the range exist in the inverted index. The query is evaluated using the rewritten parse tree. Wildcard queries can be handled in a similar fashion.

An Alternative One-Pass Implementation

The algorithm in previous section is optimized for inverted indexes that store payloads separately from the document IDs in the posting list. For inverted indexes that store them together, a single pass algorithm is used by directly calling GetNextMatch( ). A couple of changes need to be made. First, all ID values are instantiated to <document ID, jdewey code>. Second, UnitAdvance( ) will add one to the document ID part of target and set the jdewey code empty.

The present invention also provides for an article of manufacture having computer usable medium storing computer readable program code implementing a computer-based method to search the above-mentioned inverted index, wherein the medium comprises: computer readable program code receiving a search query and constructing a parse tree from said received search query; computer readable program code generating a first evaluation tree from said constructed parse tree to identify a set of candidate JSON documents that match said search query; computer readable program code generating a second evaluation tree from said constructed parse tree to identify a subset of said set of candidate JSON documents that exactly match said search query; and computer readable program code evaluating said received search query based on said parse tree, first evaluation tree, and second evaluation tree, and outputting results of said evaluation.

The present invention also provides for an article of manufacture having computer usable medium storing computer readable program code implementing a computer-based method of encoding JavaScript Object Notation (JSON) documents in an inverted index, wherein the medium comprising: computer readable program code generating a tree representation of a JSON document; computer readable program code shredding said JSON document into a list of <value, path, type, jdewey> tuples for each atom node, n, in said tree, where value is a label associated with n, path is a concatenation of node labels associated with ancestors of n, starting from a root of said tree, type is a description of a type of value, and jdewey of n is a partial Dewey code of its closest ancestor array node, if one exists, or empty, otherwise; computer readable program code building an inverted index using <path, type, value> as index term, and jdewey as payload.

The present invention also provides for an article of manufacture having computer usable medium storing computer readable program code implementing a computer-based method to search the above-mentioned inverted index, wherein the medium comprises: computer readable program code receiving a search query and constructing a parse tree from said received search query; computer readable program code generating a first evaluation tree from said constructed parse tree to indentify a set of candidate JSON documents that match said search query; computer readable program code generating a second evaluation tree from said constructed parse tree to identify a subset of said set of candidate JSON documents that exactly match said search query; and computer readable program code evaluating said received search query based on said parse tree, first evaluation tree, and second evaluation tree, and outputting results of said evaluation.

Figure 22A:
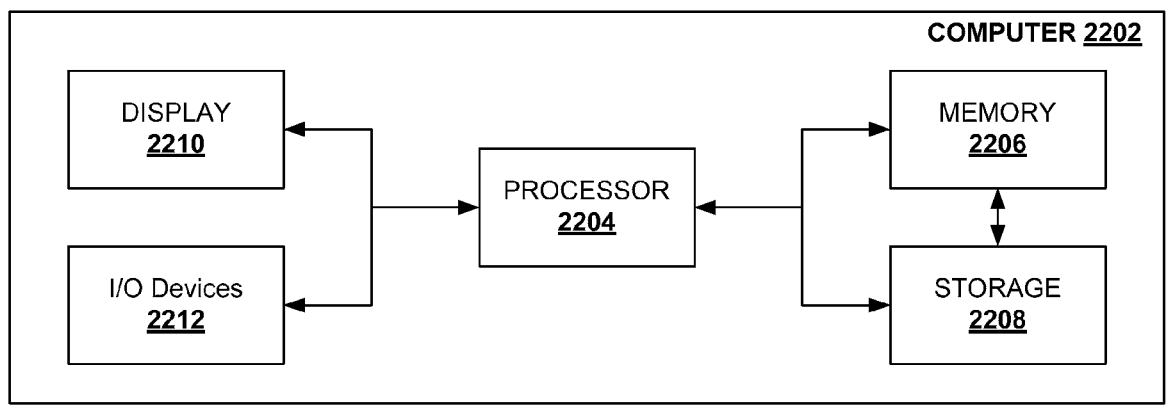
FIG. 22A illustrates a computer-based system to encode JavaScript Object Notation (JSON) documents in an inverted index.

The present invention also provides a computer-based system 2202, as shown in FIG. 22A, to encode JavaScript Object Notation (JSON) documents in an inverted index. The computer system shown in FIG. 22 comprises processor 2204, memory 2206, storage 2208, display 2210, and input/output devices 2212. Storage 2208 stores computer readable program code implementing one or more modules for encoding JavaScript Object Notation (JSON) documents in an inverted index.

Figure 22B:
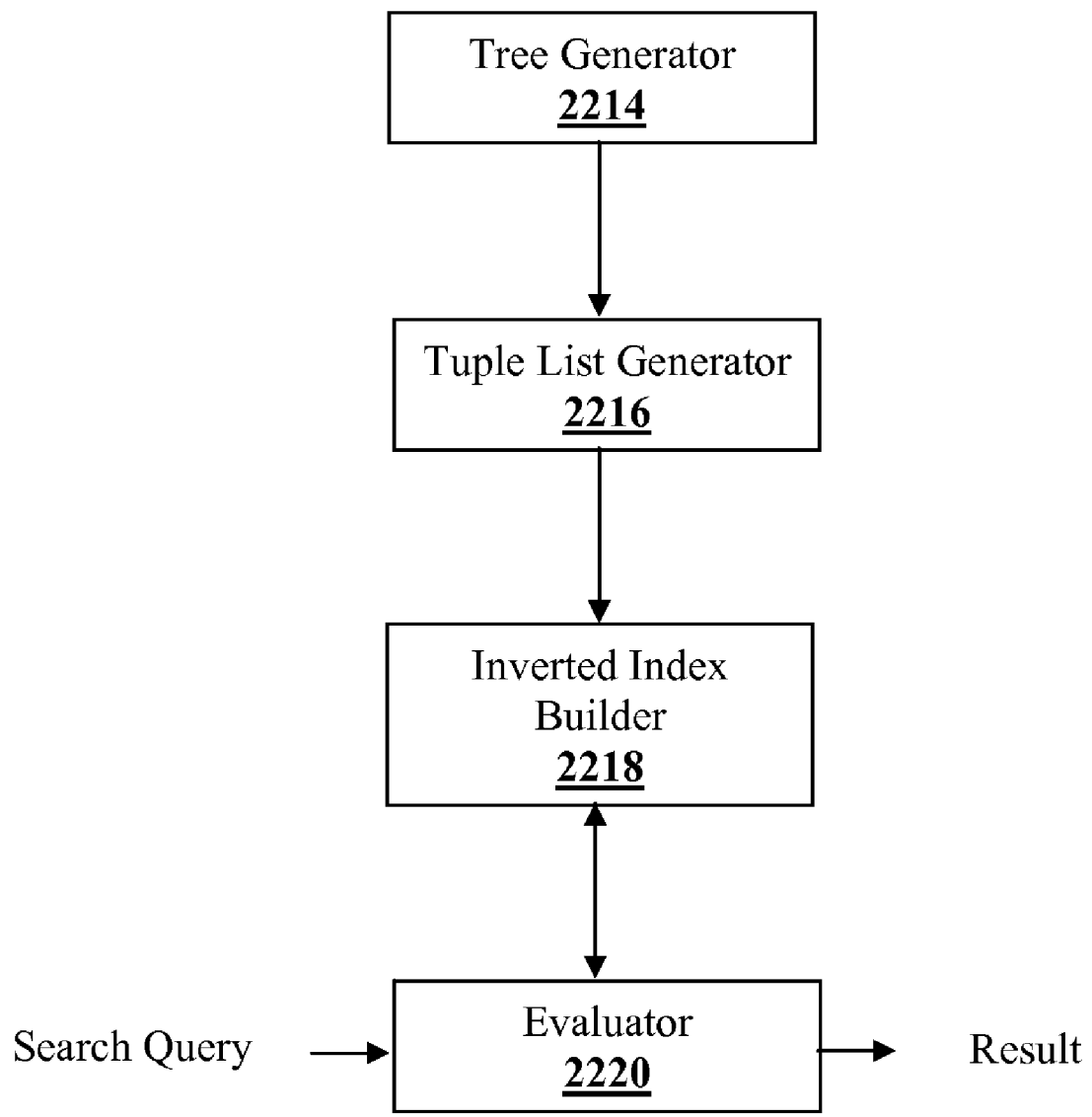
FIG. 22B illustrates the modules stored in the storage of FIG. 22A.

FIG. 22B illustrates one embodiment wherein storage 2208 stores first 2214, second 2216, third 2218, and fourth 2220 modules, each of which are implemented using computer readable program code. First module ("Tree Generator") 2214 implemented in computer readable program code generates a tree representation of a JSON document. Second module ("Tuple-List Generator") 2216 implemented in computer readable program code shreds said JSON document into a list of <value, path, type, jdewey> tuples for each atom node, n, in said tree, where value is a label associated with n, path is a concatenation of node labels associated with ancestors of n, starting from a root of said tree, type is a description of a type of value, and jdewey of n is a partial Dewey code of its closest ancestor array node, if one exists, or empty, otherwise. Third module ("Inverted Index Builder") 2218 implemented in computer readable program code builds an inverted index using <path, type, value> as index term, and jdewey as payload. Fourth module ("Evaluator") 2220 implemented in computer readable program code constructs a parse tree from a received search query, generates a first evaluation tree from said constructed parse tree to indentify a set of candidate JSON documents that match said search query and a second evaluation tree from the constructed parse tree to identify a subset of the set of candidate JSON documents that exactly match the search query, evaluates the received search query based on the parse tree, the first evaluation tree, and the second evaluation tree, and outputs results of said evaluation. By using two evaluation trees, searching is accomplished via a first phase that identifies potential matching JSON documents using the index without accessing the payload and via a second phase that computes the exact matching JSON documents using said payload.

CONCLUSION

A system and method has been shown in the above embodiments for the effective implementation of a method to index and search JavaScript Object Notation (JSON) objects. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (e.g., CRT, LCD, etc.) and/or hardcopy (e.g., printed) formats. The programming of the present invention may be implemented by one having ordinary skill in the art of script programming languages, e.g., JavaScript.

The invention claimed is:

1. A method of encoding JavaScript Object Notation (JSON) documents in an inverted index, said method comprising:
   generating a tree representation of a JSON document;
   shredding said JSON document into a list of < value, path, type, jdewey> tuples for each atom node, n, in said tree, where value is a label associated with n, path is a concatenation of node labels associated with ancestors of n, starting from a root of said tree, type is a description of a type of value, and jdewey of n is a partial Dewey code of its closest ancestor array node when an ancestor array node exists and jdewey of n is empty when no closest ancestor array node exists; and building an inverted index using <path, type, value> as index term, and jdewey as payload, said inverted index is organized as a list of ordered index terms, with each term in said list of ordered index terms pointing to a posting list, and each post is a <d, plist> pair, wherein d is the document ID and plist is an ordered list of positions within said JSON document and jdewey is stored in payload of each position.

2. The method of claim 1, wherein said list of tuples are losslessly encoded.

3. The method of claim 1, wherein said method of generating a tree representation further comprises the steps of:

creating an artificial root node labeled "I"; and reviewing top level of said JSON document and adding any of or a combination of the following nodes: a child atom node corresponding to atomic values, a child field node corresponding to object fields, and a child array node corresponding to array elements.

4. The method of claim 1, wherein said method comprises the step of searching said inverted index and outputting matching JSON documents from said searching step, said searching further comprising a first phase identifies potential matching JSON documents using the index without accessing said payload and a second phase computes the exact matching JSON documents using said payload.

5. The method of claim 1, wherein said method comprises the step of searching said inverted index, said searching step further comprising the steps of:

receiving a search query and constructing a parse tree from said received search query;

generating a first evaluation tree from said constructed parse tree to indentify a set of candidate JSON documents that match said search query;

generating a second evaluation tree from said constructed parse tree to identify a subset of said set of candidate JSON documents that exactly match said search query; and evaluating said received search query based on said parse tree, first evaluation tree, and second evaluation tree, and outputting results of said evaluation.

6. The method of claim 5, wherein said first evaluation tree is generated based on removing array nodes in said constructed parse tree.

7. The method of claim 5, wherein said second evaluation tree is generated based on removing field and root nodes in said constructed parse tree.

8. The method of claim 5, wherein generation of said second evaluation tree is skipped for a predetermined type of query, and outputted results are based on evaluating said parse tree and said first evaluation tree.

9. An article of manufacture having non-transitory computer usable medium storing computer readable program code implementing a computer-based method of encoding JavaScript Object Notation (JSON) documents in an inverted index, said medium comprising:

computer readable program code generating a tree representation of a JSON document;

computer readable program code shredding said JSON document into a list of < value, path, type, jdewey> tuples for each atom node, n, in said tree, where value is a label associated with n, path is a concatenation of node labels associated with ancestors of n, starting from a root of said tree, type is a description of a type of value, and jdewey of n is a partial Dewey code comprising a Dewey code of its closest ancestor array node when an ancestor array node exists and jdewev of n is empty when no closest ancestor array node exists; and computer readable program code building an inverted index using <path, type, value> as index term, and jdewey as payload, said inverted index is organized as a list of ordered index terms, with each term in said list of ordered index terms pointing to a posting list, and each post is a <d, plist> pair, wherein d is the document ID and plist is an ordered list of positions within said JSON document and jdewey is stored in payload of each position.

10. The article of manufacture of claim 9, wherein said list of tuples are losslessly encoded.

11. The article of manufacture of claim 9, wherein said medium further comprises:

computer readable program code creating an artificial root node labeled "/"; and computer readable program code reviewing top level of said JSON document and adding any of or a combination of the following nodes: a child atom node corresponding to atomic values, a child field node corresponding to object fields, and a child array node corresponding to array elements.

12. The article of manufacture of claim 9, wherein said medium further comprises computer readable program code searching said inverted index and outputting matching JSON documents from said searching step, said searching further comprising a first phase identifies potential matching JSON documents using the index without accessing said payload and a second phase computes the exact matching JSON documents using said payload.

13. The article of manufacture of claim 9, wherein said medium further:

computer readable program code receiving a search query and constructing a parse tree from said received search query;

computer readable program code generating a first evaluation tree from said constructed parse tree to indentify a set of candidate JSON documents that match said search query;

computer readable program code generating a second evaluation tree from said constructed parse tree to identify a subset of said set of candidate JSON documents that exactly match said search query; and computer readable program code evaluating said received search query based on said parse tree, first evaluation tree, and second evaluation tree, and outputting results of said evaluation.

14. The article of manufacture of claim 13, wherein said first evaluation tree is generated based on removing array nodes in said constructed parse tree.

15. The article of manufacture of claim 13, wherein said second evaluation tree is generated based on removing field and root nodes in said constructed parse tree.

16. The article of manufacture of claim 13, wherein generation of said second evaluation tree is skipped for a predetermined type of query, and outputted results are based on evaluating said parse tree and said first evaluation tree.

* * * * *